March 17, 1925.  1,529,838

T. P. LITTLE

TIRE BUILDING APPARATUS

Filed Dec. 8, 1922

INVENTOR

Thomas P. Little

BY

ATTORNEY

Patented Mar. 17, 1925.

1,529,838

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Application filed December 8, 1922. Serial No. 605,622.

*To all whom it may concern:*

Be it known that I, THOMAS P. LITTLE, a citizen of the United States of America, residing at Chicopee Falls, in the county of Hampden and State of Massachusetts, have invented certain new and useful Improvements in Tire-Building Apparatus, of which the following is a specification.

The present invention relates to apparatus adapted for building pneumatic tire casings, particularly with reference to the steps of stretching endless bands of tire forming material prior to their incorporation in the tire structure. It has for its principal objects the improvement of other devices for like purposes in features of simplicity, economy, rapidity, and independence upon the whim of the workman. Other objects will appear from the following description and claims.

The invention will be described with particular reference to the accompanying drawings, in which—

Figure 1:
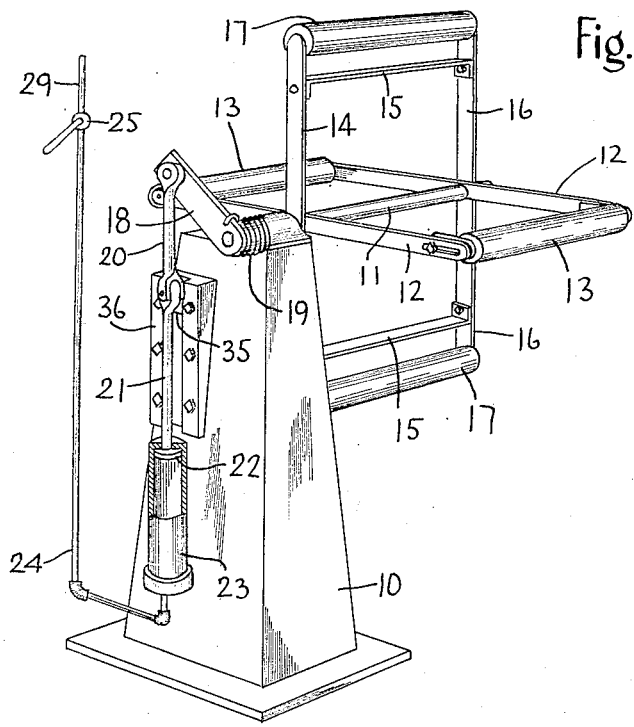
Fig. 1 is a perspective view, partly broken away, of the improved apparatus.

In one method of tire building, which is described in detail in the application of Neal and Logan, Serial No. 594,755, filed October 16, 1922, an endless band of tire building material is stretched from a circumference substantially that of the base of the tire to be built, removed from the stretching device, and permitted to contract upon a tire building form under conditions set forth in that application. The present invention is directed to apparatus for stretching the band, and is an improvement upon the details of the various forms of apparatus shown in the application of Franklin G. Neal, Serial No. 597,260, filed October 27, 1922.

Before describing the use of the apparatus in more detail, its construction will be considered. Mounted upon a standard 10 is a shaft 11 having fixed thereon a pair of parallel arms 12. Between the ends of these arms are mounted freely turning rollers 13, preferably mounted on anti-friction bearings. Secured to standard 10, and loosely fitted on shaft 11, is an arm 14 from which braces 15 extend to a similar arm 16 through which the shaft also turns freely. The ends of arms 14 and 16 are connected by freely turning rollers 17. Due to the braces and rollers the arms 14 and 16, together with rollers 17, form a stationary rectangular frame with relation to which the frame formed by arms 12 and rollers 13 is adapted to move.

Figure 2:
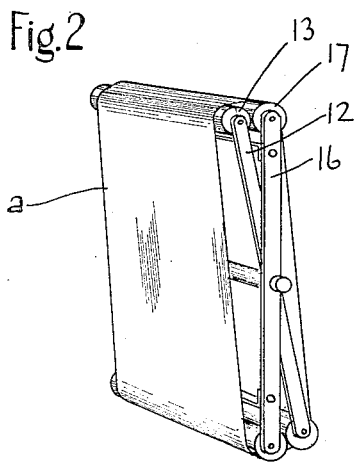
Fig. 2 is a perspective of the band of tire building material prior to being acted upon by the apparatus.

In order to rotate shaft 11, and consequently the frame comprising arms 12 and rollers 13, the shaft carries a lever arm 18 having a helical spring 19 attached to it at one end and to the standard 10 at the other; the rollers 13 being normally held by the action of the spring in adjacency to rollers 17 (Fig. 2). The lever arm is pivoted to a connecting rod 20, pivoted in turn to a piston rod 21 attached to a piston 22 running in a cylinder 23 fastened to the side of support 10. A block 35, sliding in ways 36 on the standard, keeps the piston rod 21 in proper straight line relation to the cylinder. Air under pressure may be admitted to the cylinder underneath the piston through a pipe 24 in which is a controlling valve 25, preferably of the three-way type, serving to admit air or to vent the air in the cylinder and allow the piston to fall.

Figure 5:
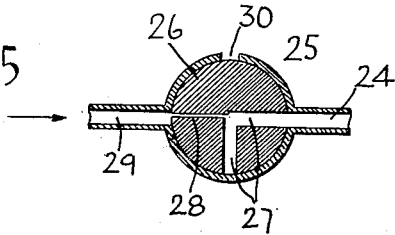
Fig. 5 is a sectional detail of an air valve.

The valve is shown in section in Fig. 5. It comprises a shell in which turns a spindle 26 having a right angled hole 27 and a smaller hole 28. Attached to the shell is an inlet pipe 29, the pipe 24 previously referred to, and a discharge port 30. With the valve in the position of Fig. 5 air will flow through the pipe 29, holes 28 and 27, and through pipe 24 to the cylinder 23. If the spindle is rotated 90° to the left from this position the right angled hole 27 will connect pipe 24 to discharge port 30, permitting spring 19 to depress the piston and force the air out.

Hole 28 is preferably made small enough so that when the valve is opened (i. e., turned to the position of Fig. 5) the flow of air will be retarded and too rapid operation of the stretching device prevented. As will hereinafter appear, it is desirable to have the stretcher operate with sufficient slowness so that the band which is to be stretched can be shifted around the stretcher rolls so that it will not become distorted. The small aperture 28 automatically insures the proper retardation. I have found that for a pressure of about 70 pounds per square inch a diameter of $\frac{3}{64}$ of an inch will give satisfactory results, but this measurement may be departed from as desired to give correct results in any special case. When the valve is in its discharge position the small aperture will not function, and the air from cylinder 23 will be discharged directly into opening 30 through the larger hole 27. This will permit a rapid return of the piston to its lower position, thus hastening the release of the expanded band from the stretcher. The small hole 28 is described as being incorporated in the valve. If desired the valve may have holes of uniform size, and a plug with a small aperture inserted in pipe 29.

Figure 3:
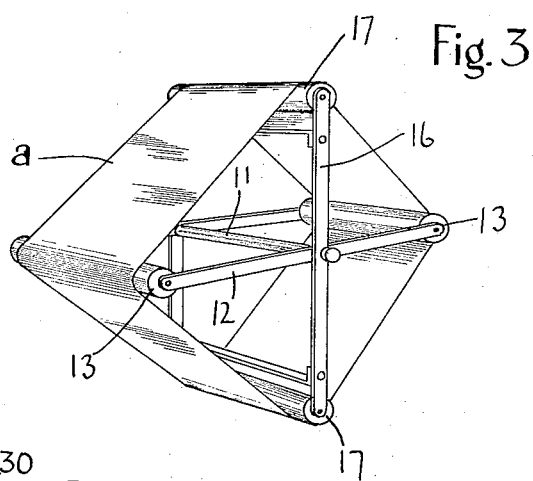
Fig. 3 is a similar view illustrating the action of the apparatus upon the band.

In use, a band $a$ of tire building material is formed of the desired length and slipped over the rollers while the piston 22 is at its lower position, rollers 13 and 17 being therefore closely adjacent each other. The band at this time has something the appearance of Fig. 2. Valve 25 is then turned to admit air under the piston. This causes the frame comprising arms 12 and rollers 13 to turn until it reaches the position of Fig. 1. The band is thus forced to a shape such as indicated in Fig. 3. As the perimeter of the practically square figure, bounded by the four rollers in their latter position, is greater than that of the narrow rectangle bounded by them when they are in the position of Fig. 2, the band will be stretched during this movement a considerable amount. As this stretching proceeds, the band is preferably shifted circumferentially around the freely rotating rollers by the operator, so that the friction of the rollers on the fabric will not be localized at any given line and the stretching will be uniform. After the desired stretch has been given the air pressure will be released, and the rollers will be moved to their original positions by the action of the spring 19.

Figure 4:
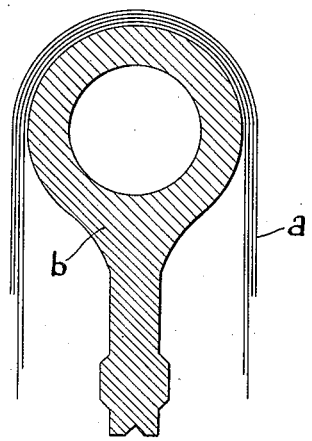
Fig. 4 is a sectional detail showing one stage in the application of a stretched band to a tire forming support.

The band, being made partially of unvulcanized rubber, will contract as soon as the expanding force is released, but more slowly than the movement of the rollers, and can be readily removed from the stretcher. In the period while the rollers are moving to unexpanded position and the band is being removed, the band will readjust itself so that when the operator centers it about a core $b$, or other building form, it will have uniform conditions of tension throughout its extent. After the band is centered on the form it will continue to contract, assuming substantially the position shown in Fig. 4. Subsequent building operations are fully disclosed in the Neal and Logan application referred to, and need not be considered here.

Having thus described my invention, I claim:

1. A tire building apparatus comprising relatively movable members adapted to receive an endless band of tire material, fluid pressure means to move the members to stretch the band, and a restricted passage between the apparatus and the source of fluid pressure to retard the action of the device.

2. A tire building apparatus comprising relatively movable members adapted to receive an endless band of tire material, fluid pressure means to move the members to stretch or release the band, and a restricted passage between the apparatus and the source of fluid pressure, and operative only during the stretching operation, to retard the action of the device.

THOMAS P. LITTLE.